United States Patent [19]

Egen

[11] Patent Number: 4,473,234
[45] Date of Patent: Sep. 25, 1984

[54] CARRIAGE FOR TRAVERSING STAIRS

[76] Inventor: David P. Egen, 17 E. 67th St., New York, N.Y. 10021

[21] Appl. No.: 319,417
[22] Filed: Nov. 9, 1981
[51] Int. Cl.³ .............................................. B62B 5/02
[52] U.S. Cl. .................................. 280/5.22; 280/650; 280/DIG. 10; 297/31; 297/DIG. 4; 474/140
[58] Field of Search .............. 280/5.22, 650, DIG. 10; 180/9.22; 474/190, 260, 273, 264, 237, 167, 140; 297/31, 32, 55, 56, 57, DIG. 4

[56] References Cited

U.S. PATENT DOCUMENTS

| | | | |
|---|---|---|---|
| 1,341,470 | 5/1920 | Kinnard | 474/237 |
| 1,949,282 | 7/1934 | Murray | 297/31 |
| 2,072,222 | 3/1937 | Schuttkus | 280/5.22 |
| 2,715,533 | 8/1955 | Strausburg | 280/5.22 |
| 2,883,731 | 4/1959 | Wells | 280/47.26 |
| 3,106,980 | 10/1963 | Rogneby | 180/9.22 |
| 3,231,290 | 1/1966 | Weyer | 280/5.22 |
| 4,033,595 | 7/1977 | Mauch | 280/5.22 |
| 4,136,888 | 1/1979 | Bowie, Jr. et al. | 280/5.22 |

FOREIGN PATENT DOCUMENTS 1084143  6/1960  Fed. Rep. of Germany ..... 280/5.22

Primary Examiner—John A. Pekar
Assistant Examiner—D. Lynn Fugate
Attorney, Agent, or Firm—Pasquale A. Razzano

[57] ABSTRACT

A carriage for descending stairs carrying a person under the control of an operator, i.e., an able-bodied person walking behind the carriage. The person in the carriage rests upon a seat with an upright back. The carriage is supported at its sides upon two support units each of which has an endless belt which extends along a rigid longitudinal frame with two pulleys mounted upon horizontal axes at the opposite ends of the frame, and with belts extending around those pulleys and forming two longitudinal runs between the pulleys. Each belt is formed by a continuous strip of heavy fabric with a continuous strip of flexible rubber bonded to the fabric. The belts of the support units act as brakes to retard the movement down the stairs. Each frame construction is a rigid channel member with a channel within which the bottom run of the belt is positioned, and the fabric belt has a high-friction surface which slides along the bottom surface presented by the frame construction and the entire weight is supported by those mating surfaces. The top run of each belt is held in an upper channel which insure alignment of the belts and may also impose a braking action on the free movement of the belt. The flexible rubber of the bottom runs of the belts cling to the edge of each stair step so as to permit movement of the carriage only by overcoming the braking action on the belts. A fixed handle is provided for use in moving the carriage to the stairway and directly onto the top steps by a continuous movement. An extensible handle is then pulled out so that the operator can control the carriage more readily during the descent on the stairs.

13 Claims, 9 Drawing Figures

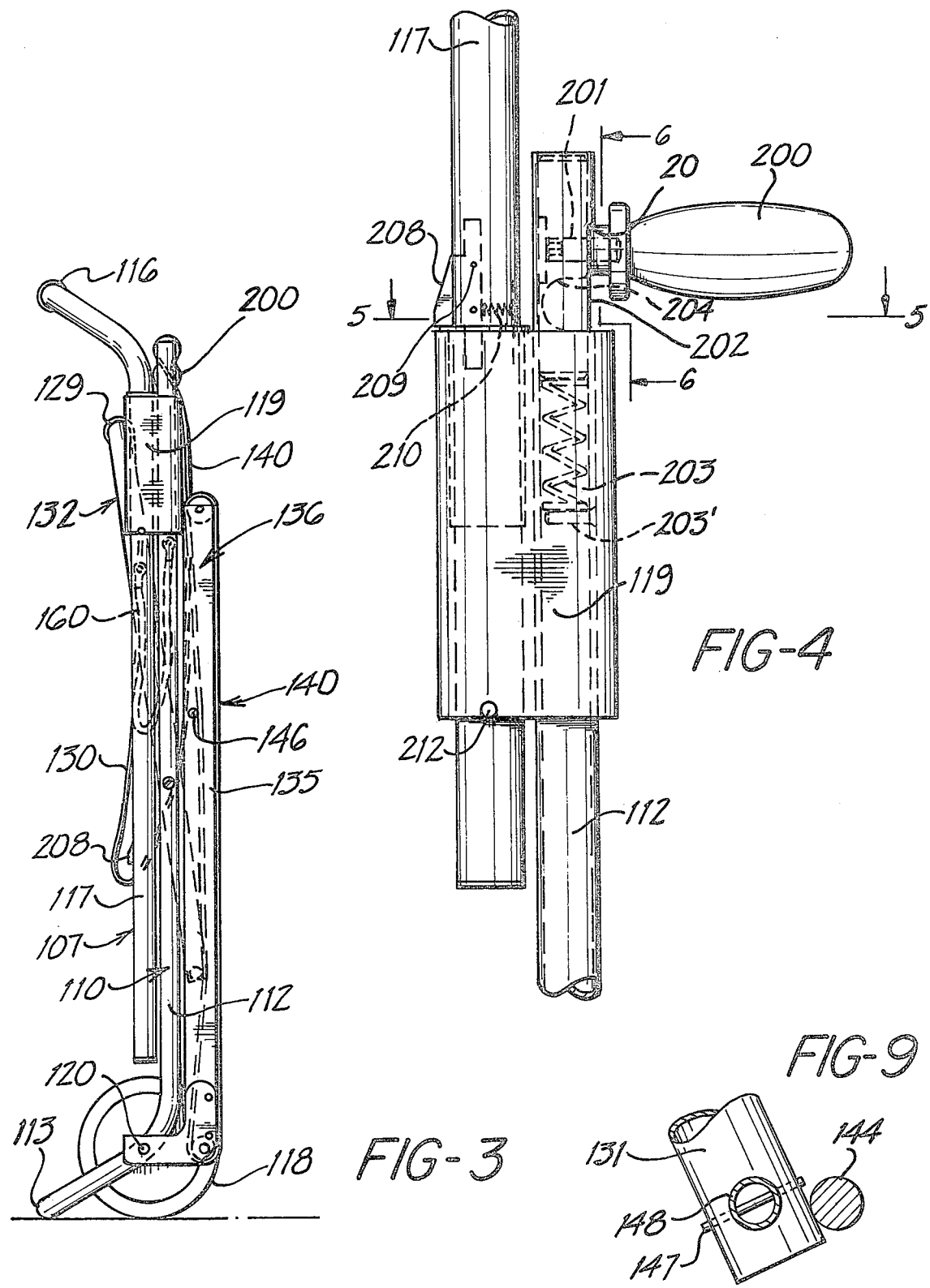

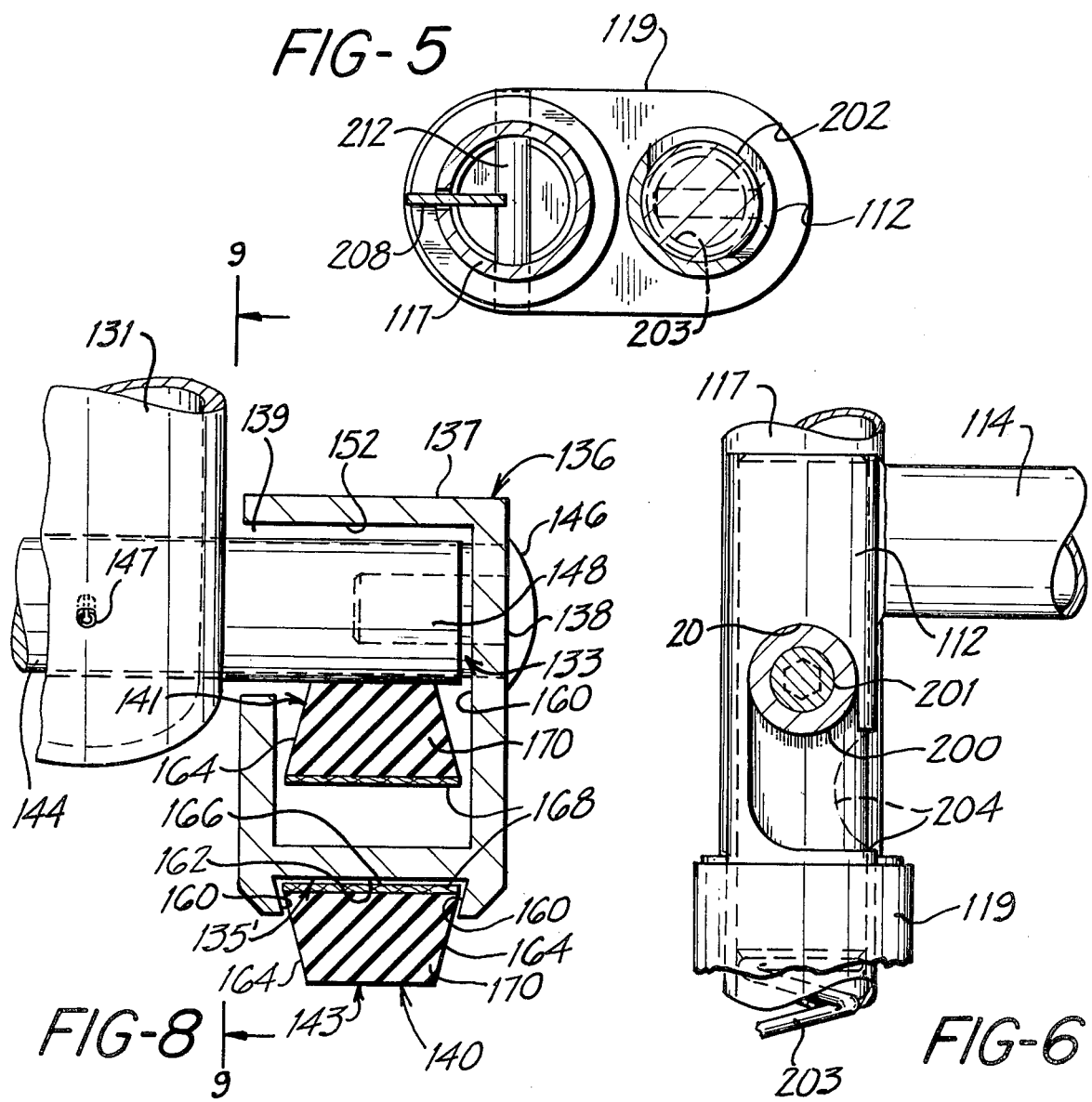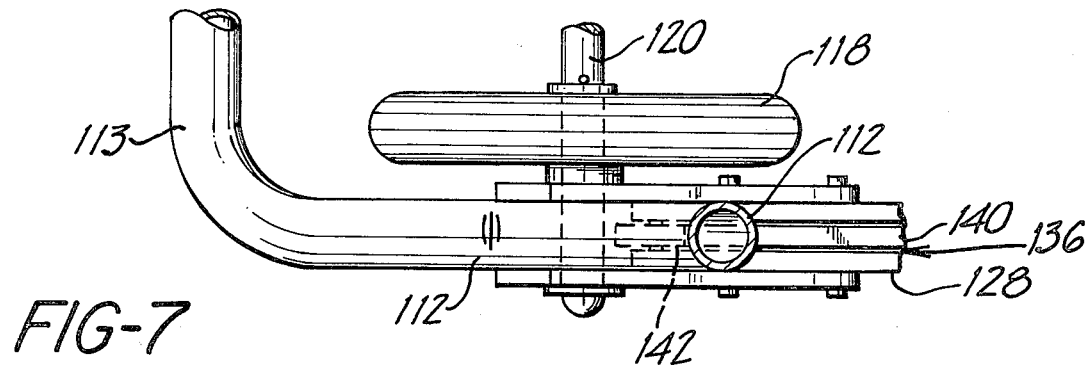

CARRIAGE FOR TRAVERSING STAIRS

This invention relates to providing carriages for descending stairs carrying a person who is unable to walk. More in particular, the invention provides a carriage for use by an operator for carrying a person down stairs.

Many people work or live at high elevations in buildings, and because of one disability or another are unable to traverse stairs, and normally rely solely on elevators in the building for moving from floor to floor. However, fire departments advocate against the use of elevators in instances of fire, threats of bombs or explosions, black-outs or any other emergency condition. Therefore, the stairs must be relied upon as the sole means of escaping from the building in any such emergency. In most such circumstances, there are able-bodied people present who can assist those who require help in descending the stairs. The present invention relates to improved means for providing such assistance. This is particularly important in highrise office or residential buildings where the chance of such an emergency appears to be small, but it is nevertheless necessary to be prepared for such an emergency.

In accordance with the present invention, a carriage is provided which permits a person to be carried down the stairs under the complete control of an operator, and in a relatively short time without discomfort to the person being carried.

Another aspect of the invention is that the carriage is collapsible so that it can be stored inconspicuously and in a relative small space. Furthermore, the carriage is quickly erected from its collapsed condition so that there is no objectionable delay in placing it into use. The carriage is light in weight so that during an emergency it can be carried back up the stairs and used repeatedly if there is a need to do so. Most buildings have fireproof stairways where people may wait in safety for an operator to return after taking a first person down the stairs.

IN THE DRAWINGS

FIG. 3 is a side view of the carriage of FIGS. 1 and 2 collapsed for storage and for handling;

FIG. 4 is an enlarged view of the central portion of FIG. 1 with parts broken away to show internal structure;

FIGS. 5 and 6 are enlarged sectional views on the lines 5—5 and 6—6, respectively, of FIG. 4.

Figure 1:
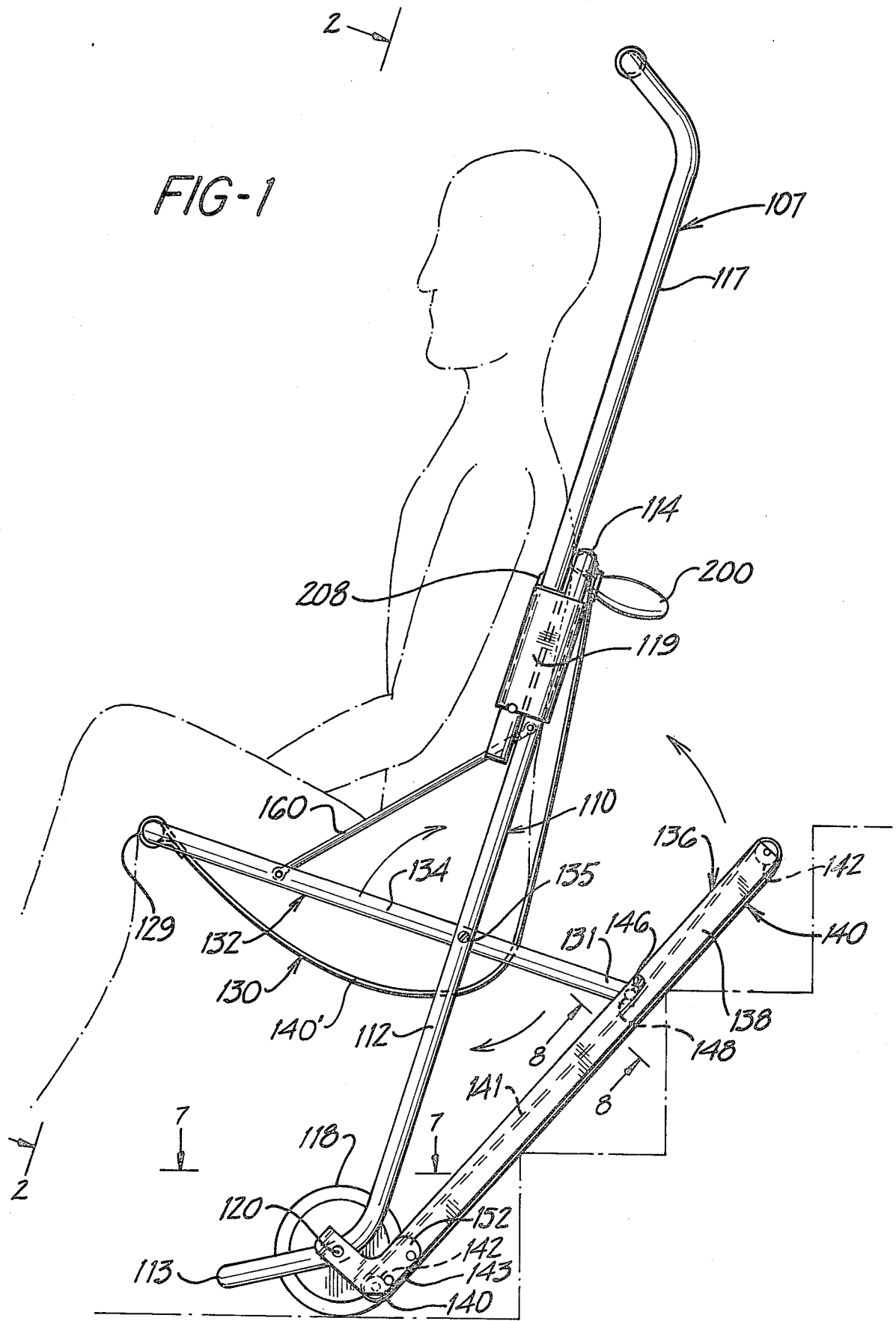
FIG. 1 is a side elevation of a carriage constituting one embodiment of the invention.

FIG. 6 is an enlarged sectional view on the line 6—6 of FIG. 1;

FIG. 7 is a sectional view on the line 7—7 of FIG. 1;

FIG. 8 is an enlarged sectional view on the line 8—8 of FIG. 1; and,

FIG. 9 is a sectional view on the line 9—9 of FIG. 8.

Frame 110 is formed of aluminum tubing with parallel sides 111 and 112, a bottom 113 and a top portion which is a handle 114. An inverted U-frame 107 has a top portion which is a handle 116. Sides 115 and 117 are slidably mounted in bores in brackets 119 which are mounted on the respective sides 111 and 112 (see also FIG. 5). The tops of sides 115 and 117 and the bottoms of sides 111 and 112 are curved forwardly (FIG. 1). When in the extended position of FIGS. 1, 2 and 4, the U-frame is held by a latch 208 on sides 115 and 117. The latches are pivoted at 209 and are urged to the latching position by springs 210, and the latches are pressed in to release them. At the bottom of each bracket, there is a notch into which a stop pin 212 moves to limit the upper movement of U-frame 107. That provides a rigid relationship between the U-frame and the main frame.

A pair of wheels 118 is rotatably mounted near the bottom of frame 110 on an axle 120 (see FIGS. 2 and 7) which is mounted at its ends in sides 111 and 112. The forwardly curved bottom portion of frame 110 (see FIG. 3) cooperates with wheels 118 to support the carriage upon the floor when the carriage is collapsed. When the carriage is in operative condition (FIG. 1), wheels 118 are positioned at the forward and downward end of the carriage, and portion 113 of frame 110 is positioned forwardly of the wheels.

A sling type of seat 130 is formed by a rectangular flexible sheet 140' which is supported by sleeve portions which enclose the top portion 114 of the main frame, and the front portion 129 of a tubular aluminum U-frame 132 which interconnects parallel sides portions 134. U-frame 132 is pivotally mounted on a pair of pivot bolts 135 which extend through the respective sides 111 and 112 of main frame 110 so that the seat is adapted to swing between the extended position of FIG. 1 and the collapsed position of FIG. 3 in which it is substantially parallel to and between sides 111 and 112. Two side carriages 136 are mounted upon an axle 120 (see also FIG. 7) adjacent to the respective frame sides 111 and 112 by hinge brackets 128. Side portions 134 of the seat frame have extensions 131 which project beyond pivot bolts 135 and interlock at their ends with carriages 136. Cables 160 provide support for the seat.

Each of side carriages 136 has a channel bar 138 with (see FIG. 8) an upper channel 133, a lower channel 135', with a top wall 137, and a slot 139 adjacent top wall 137. An endless-belt 140 has an upper run 141 and a bottom run 143, and a pair of of rollers 142 at the ends of channel 138 upon which belt 140 is mounted. A transverse bar 144 extends between the free (upper) ends of channel bars 138 and is rigidly attached to the respective channel bars at its ends by screw bolts 146 (see also FIG. 1) so that the side carriages form a unitary support structure.

The upper run of belt 140 extends beneath bar 144 in the upper channel so that the belt run is held in the channel. Mounted upon the end of each of seat frame extensions 131 of the seat frame and at right angles thereto is a cylindical foot 148 which is attached by a press-fit pin 147 and extends through slot 139 into upper channel 133. Each foot 148 is positioned between the bottom surface 152 of the top wall 137 and the belt run 141, and moves along surface 152 between the lower end of channel 133 when the carriage is collapsed (FIG. 3) and the operative position of the carriage (FIG. 1). During the movement of the seat from the collapsed position to the operative position, the side carriages are also moved to their operative positions. In the operative position, the end of each seat frame extension 131 (FIGS. 1 and 9) is pressed against the end of bar 144. Hence, extensions 131 act as cantilevers between bolts 135 and the side carriages to provide support for a person on the seat, and cables 160 provide additional support at the front of the seat. Each side of the main frame and its seat extension form an "X-support" between the seat and the front and rear ends of the side carriages. Hence, the person is supported upright above the side carriages.

Figure 2:
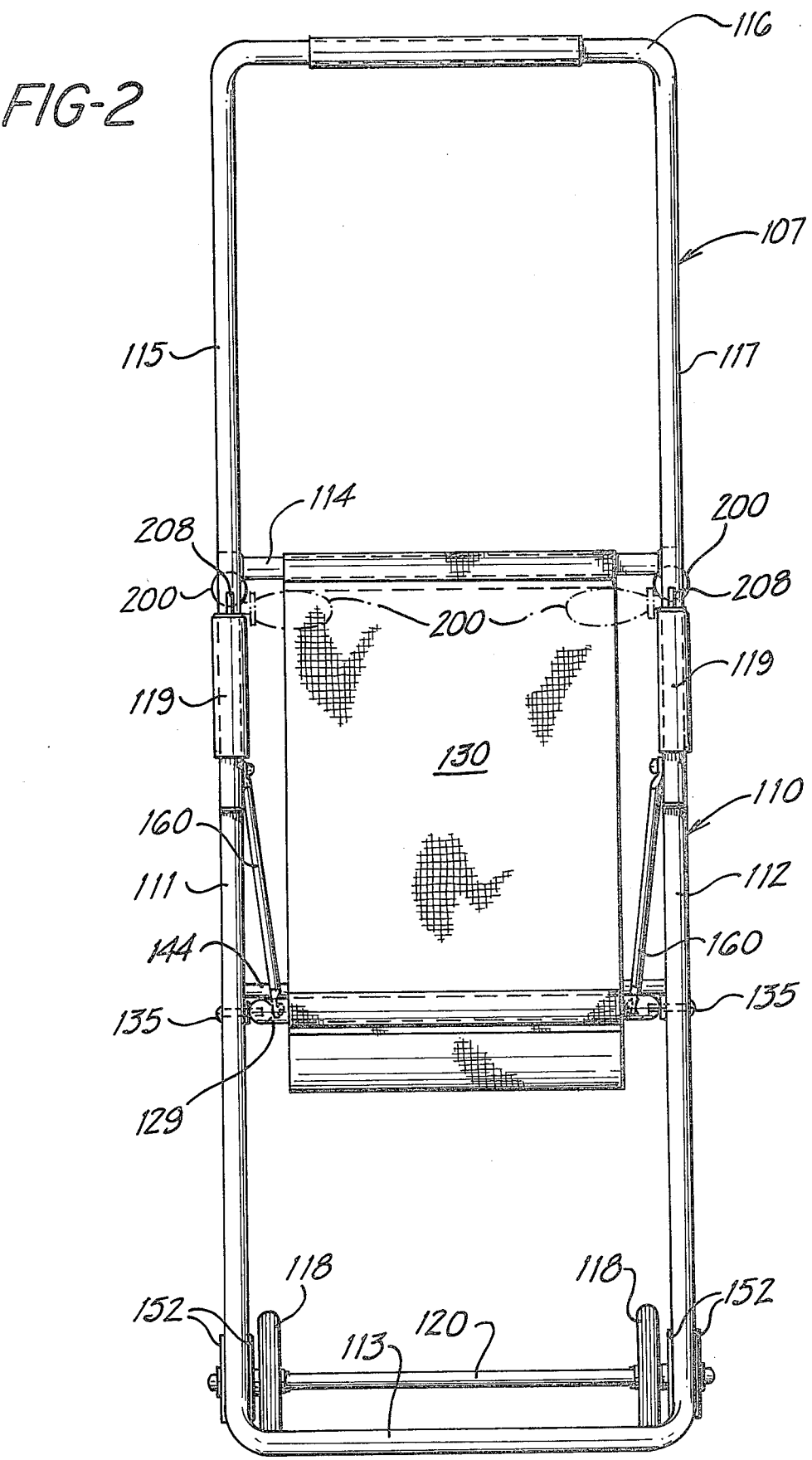
FIG. 2 is a front view on the view line 2—2 of FIG. 1.

Referring to FIGS. 2, 3 and 4, two handles 200 are mounted upon the tops of the sides of the main frame above brackets 119, and are adapted to swing between the operative position of FIG. 4, and the collapsed position shown in broken lines in FIG. 1. Each handle has an extension which is secured in a cyclindrical slide 202 in the top of the side of the main frame and is urged upwardly by a spring 203 which is supported at its lower end by a screw 203′ threaded into the tube wall. When in the operative position (FIGS. 1 and 4), the handles are held securely in a notch 20 in the tube wall, and the operator can handle the chair by grasping the two handles. When the chair is being collapsed, each handle is pushed downwardly against the action of spring 203 and is rotated 90° into a slot 204 in the side wall of the frame wall. The handles are returned to the position of FIG. 4 by reverse actions.

Belt 140 is formed by a strip 168 of high-friction fabric to which is bonded a strip 170 of flexible rubber. The lower channel 135′ has side walls 160 which are at an angle of the order of 75° from the bottom load-supporting surface 162 in the channel. The side surfaces 164 of the belt are at the same angle to the top belt surface 166 which mates with surface 162. The side walls of the channel overhang the edges of the belt so that the belt is held in proper alignment in channel 135′.

While the carriage is descending stairs, the bottom run of each belt 140 is stationary on at least two stairs at all times, and in effect provides a "continuous track" or slide for its channel bar 138. The channel bars are rigid so that they provide flat surfaces which slide on the belts.

As discussed above, the friction between the high-friction fabric strips and the channel bar surfaces 162 provides a continuous braking effect which varies with or can be considered a "function" of the weight of the person being carried. Therefore, the operator does not need to operate a brake, as would be necessary if the carriage did not have the "self-adjusting" braking effect. That is significant because under emergency the device which operate with a self braking action which varies over a wide range depending upon the weight of the person being carried.

The action of lowering the seat locks the carriage in its fully operative condition, and handles 200 are swung to their operative position so that it can be moved along the floor on wheels 118. Extension handle 116 is then pulled out to move down stairs on the side carriages. The operator can carry a person on a level floor or on a low-sloping ramp using the wheels, and with the side carriages lowered can move directly from a level floor onto stairs without stopping. The carriage is collapsed easily and can be stored in a small space where it is available for immediate use.

The illustrative embodiment is a carriage for a person, although it is understood that the invention is adaptable to carriages for other loads.

Although one illustrative embodiment of the invention has been disclosed herein with reference to the accompanying drawings, it is to be understood that the invention is not limited to that embodiment, and that various changes and modifications may be made therein without departing from the scope of this invention as set out in the claims.

What is claimed is:

1. In a carriage for descending stairs carrying a person in seated position under the control of an operator, the combination of, a main frame having parallel side portions which are spaced from each other to provide a seating space located between said side portions and forwardly thereof, seat means positioned within said seating space and adapted to be collapsed adjacent said area, said seat means including a back located rearwardly of said side portions when the device is in operation and a seat which extends from said back forwardly of said side portions, two wheels rotatably mounted upon the lower portion of said main frame and adapted to provide support for the carriage when it is moved along a level surface, and an elongated support structure which is attached to said main frame at the lower end thereof and is adapted to move between a collapsed position wherein it is substantially parallel to an adjacent said main frame and an extended position wherein it is adapted to support said main frame and said seat means upon stairs when said seat means is positioned to carry a person, said elongated support structure comprising endless belt means and mounting means for said belt means including means for defining and engaging bottom-run of the belt means which bottom-run engages the edge of each step of stairs as said carriage moves downwardly thereon and which has a length sufficient to engage the edges of at least two steps at the same time to provide a fixed supporting relationship between said bottom-run and each of said stairs, said mounting means and said bottom-run having co-extensive relatively flat mating surfaces whereby said mounting means is supported by said bottom-run solely through said mating surfaces as said mounting means slides down said stairs on said bottom-run, said mating surfaces having friction characteristics along their entire length which produce resistance to the movement of said mounting means upon said endless-belt means at each point of engagement of said bottom-run with a stair edge to thereby provide a continuous braking action of a predetermined range which restrains the movement of said carriage down said stairs while a person on the seat means is supported between said side portions above said elongated support structure.

2. In a carriage for descending stairs carrying a person in seated position under the control of an operator, the combination of, a main frame having parallel side portions which are spaced from each other to provide a seating space which extends forwardly of the area between said side portions, seat means positioned within said seating space and adapted to be collapsed adjacent said area, two wheels rotatably mounted upon the lower portion of said main frame and adapted to provide support for the carriage when it is moved along a level surface, and an elongated support structure which is attached to said main frame at the lower end thereof and is adapted to move between a collapsed position wherein it is substantially parallel to and adjacent said main frame and an extended position wherein it is adapted to support said main frame and said seat means upon stairs when said seat means is positioned to carry a person, said elongated support structure comprising endless belt means and mounting means for said belt means and forming bottom-run means which engages the edge of each step of stairs as said carriage moves downwardly thereon and which provides a fixed supporting relationship between said bottom-run means and each of said stairs, said mounting means and said bottom-run means having co-extensive mating surfaces whereby said mounting means is supported by said bottom-run means solely through said mating surfaces as said mounting means slides down said stairs on said bottom-run means, said mating surfaces having friction characteristics which produce resistance to the movement of said mounting means upon said endless-belt means to thereby provide a braking action of a predetermined range which restrains the movement of said carriage down said stairs, and wherein said seat means includes a U-frame with parallel side portions hinged to said main frame and adapted to swing between a collapsed position and an extended position in which provides support for said person, and wherein said side portions of said U-frame have extensions and which inter-engage with said elongated support structure when said carriage is in operative condition and provide support therefrom for said person positioned on said seat.

3. The carriage construction as described in either of claims 1 or 3 wherein said mounting means comprises two elongated members and means mounting each of said members to swing between a position parallel to a respective one side of said main frame and its operative position wherein it is at a predetermined angle to said main frame with its upper end spaced from said main frame, and wherein said seat means includes a pair of parallel side portions which extend along its opposite sides and which have end portions which extend rearwardly therefrom when said carriage is in operative condition and which inter-engage with said mounting means to thereby provide support and aid in holding said elongated members in said operative position.

4. In a carriage for descending stairs carrying a person in seated position under the control of an operator, the combination of, a main frame, seat means which is mounted upon said main frame and which is adapted to move between an operative position in which it is adapted to support a person and a collapsed position, and a support structure which is attached to said main frame at the lower end thereof and is adapted to move between a collapsed position and an extended position wherein it is adapted to support said main frame and said seat means, said seat means being located to support a person on the carriage above said support structure when the carriage is in said extended position, said support structure comprising endless belt means and mounting means for said belt means, said endless belt means forming bottom-run means including means for engaging the edge of each of said stairs as said carriage moves downwardly thereon and for providing a fixed supporting relationship between said bottom-run means and each of said stairs, said mounting means and said bottom-run means having co-extensive relatively flat mating surfaces along the entire length of said mounting means, said mounting means having a length sufficient to span the edges of at least two steps at the same time whereby said mounting means is supported by said bottom-run means solely through said mating surfaces at at least two points as said mounting means slides down said stairs on said bottom run means, said mating surfaces having friction characteristics along their entire length which produce resistance to the movement of said mounting means upon said endless-belt means at said at least two points to thereby provide a continuous braking action of a predetermined range which restrains the movement of said carriage down said stairs.

5. In a carriage for descending stairs carrying a person in seated position under the control of an operator, the combination of, a main frame, seat means mounted upon said main frame and adapted to move between an operative condition in which it is adapted to support a person and a collapsed condition, two wheels rotatably attached to the lower portion of said main frame and adapted to provide support for the carriage when it is moved along a level surface, and a support structure attached to said main frame at the lower end thereof and adapted to move between a collapsed condition wherein it is substantially parallel to and adjacent said main frame and an operative condition wherein it is positioned to support said main frame and said seat means upon stairs with said seat means in said operative condition and located above said support structure between said main frame, said support structure comprising endless belt means and mounting means for said belt means, said endless belt means forming bottom-run means which includes means for engaging the edge of each of said stairs as said carriage moves downwardly thereon to provide a fixed supporting relationship between said bottom-run means and each of said stairs, said mounting means and said bottom-run means having co-extensive mating surfaces along the entire length of said mounting means, said mounting means having a length sufficient to span the edges of at lest two steps at the same time whereby said mounting means is supported by said bottom-run means solely through said mating surfaces at at least two points as said mounting means slides down said stairs on said bottom run means, said mating surfaces having friction characteristics along their entire length which produce resistance to the movement of said mounting means upon said bottom-run means at at least two points to thereby provide a continuous braking action which is of a predetermined range relative to the weight of said person and which restrains the movement of said carriage down said stairs.

6. The construction as described in claim 5, which includes locking means which holds said support structure in its operative condition when said seat means is in its operative position.

7. The construction as described in claim 6 wherein said locking means comprises two extension members which cooperate with said main frame to provide a fixed supporting relationship between said seat means and said support structure when said carriage is in its operative condition.

8. In a carriage for descending stairs carrying a person in seated position under the control of an operator, the combination of, a main frame, seat means mounted upon said main frame and adapted to move between an operative condition in which it is adapted to support a person and a collapsed condition, two wheels rotatably attached to the lower portion of said main frame and adapted to provide support for the carriage when it is moved along a level surface, and a support structure attached to said main frame at the lower end thereof and adapted to move between a collapsed condition wherein it is substantially parallel to and adjacent said main frame and an operative condition wherein it is positioned to support said main frame and said seat means upon stairs with said seat means is in said operative condition, said support structure comprising endless belt means and mounting means for said belt means, said endless belt means forming bottom-run means which includes means for engaging the edge of each of said stairs as said carriage moves downwardly thereon to provide a fixed supporting relationship between said bottom-run means and each of said stairs, said mounting means and said bottom-run means having co-extensive mating surfaces whereby said mounting means is supported by said bottom-run means solely through said mating surfaces as said mounting means slides down said stairs on said bottom run means, said mating surfaces having friction characteristics which produce resistance to the movement of said mounting means upon said bottom-run means to thereby provide a braking action which is of a predetermined range relative to the weight of said persion and which restrains the movement of said carriage down said stairs; locking means for holding said support structure in its operative condition when said seat means is in its operative position; said locking means comprising two extension members which cooperate with said main frame to provide a fixed supporting relationship between said seat means and said support structure when said carriage is in its operative condition; said support structure including second extensions mounted upon each of said extension members, and channel means for receiving said second extensions and having wall means which presents surfaces along which said second extensions move when said carriage is moved between said collapsed condition and said operative condition, whereby the movement of said extension members moves said support structure between its operative and collapsed positions.

9. The construction as described in claim 8, wherein said support structure includes two channel members and said endless belt means includes two endless belts, with one belt being mounted upon each of the respective channel members, each of said channel members having a top channel and a bottom channel along which the respective top and bottom runs move, each of said bottom channels presenting a supporting surface which mates with the top surface of its bottom belt run, each of said belts being formed by a strip which presents a high-friction surface to said supporting surface to form said mating surfaces.

10. In the construction as described in any of claims 1, 4, or 9 which includes handle means which is adapted to be engaged by said operator to move and control said carriage while moving on a level surface, and an auxiliary handle means comprising an inverted U-frame and bracket means mounting said U-frame to slide vertically between a collapsed position and an extended position.

11. In a carriage for descending stairs carrying a load under the control of an operator, the combination of, a main frame, load-containing means which is mounted upon said main frame, and a support structure which is attached to said main frame and is adapted to support said main frame and said load-containing means upon stairs, said support structure comprising endless belt means and mounting means for said belt means and forming bottom-run means which has a length that will span the edges of at least two stairs and which includes flexible means which engages in a stationary relationship the edge of each of said stairs at least two at a time, as said carriage moves downwardly thereon and thereby provides a fixed supporting relationship between said stairs and each portion of said endless belt means while it forms said bottom-run means, said mounting means and said bottom-run means having co-extensive mating surfaces whose length is at least sufficient to span between the edges of at least two stairs, with said bottom-run means presenting a high-friction surface, whereby said mounting means is supported by each portion of said endless belt means while it forms said bottom-run means solely through said mating surfaces whereby said mounting means slides down said stairs on said bottom-run means while supported on at least two stairs, said mating surfaces having friction characteristics which produce resistance to the movement of said mounting means upon said bottom-run means to thereby provide a continuous braking action which is of a predetermined range relative to the weight of said load and which restrains the movement of said carriage down said stairs.

12. The carriage as described in any one of claims 1, 2, 4, 5, 8 or 11, including a handle secured to said main frame and having an upper hand grip end extending forwardly of the main frame.

13. In a carriage for descending stairs carrying a person in seated position under the control of an operator, the combination of, a main frame having parallel side portions which are spaced from each other to provide a seating space which extends forwardly of the area between said side portions, seat means positioned within said seating space and adapted to be collapsed adjacent said area, two wheels rotatably mounted upon the lower portion of said main frame and adapted to provide support for the carriage when it is moved along a level surface, and an elongated support structure which is attached to said main frame at the lower end thereof and is adapted to move between a collapsed position wherein it is substantially parallel to and adjacent said main frame and an extended position wherein it is adapted to support said main frame and said seat means upon stairs when said set means is positioned to carry a person, said elongated support structure comprising endless belt means and mounting means for said belt means, including means for defining and engaging the bottom-run of the belt means which bottom-run engages the edge of each step of stairs as said carriage moves downwardly thereon and provides a fixed supporting relationship between said bottom-run and each of said stairs, said mounting means and said bottom-run having co-extensive relatively flat mating surfaces whereby said mounting means is supported by said bottom-run solely through said mating surfaces as said mounting means slides down said stairs on said bottom-run, said mating surfaces having friction characteristics which produce resistance to the movement of said mounting means upon said endless-belt means to thereby provide a braking action of a predetermined range which restrains the movement of said carriage down said stairs; said mounting means comprises two elongated members and means mounting each of said members to swing between a position parallel to a respective one side of said main frame and its operative position wherein it is at a predetermined angle to said main frame with its upper end spaced from said main frame, and wherein said seat means includes a pair of parallel side portions which extend along its opposite sides and which have end portions which extend rearwardly therefrom when said carriage is in operative condition and which interengage with said mounting means to thereby provide support and aid in holding said elongated members in said operative position; said mounting means comprising two elongated members and means mounting each of said members to swing between a position parallel to a respective one side of said main frame and its operative position wherein it is at a predetermined angle thereto with its upper end spaced from said main frame, and wherein said seat means includes a pair of parallel side portions which extend along its opposite sides and which have end portions which extend rearwardly therefrom when said carriage is in operative condition and which interengage with said mounting means to thereby provide support and aid in holding said elongated members in said operative position.

* * * * *